(12) United States Patent
Friesinger

(10) Patent No.: US 9,530,543 B2
(45) Date of Patent: Dec. 27, 2016

(54) METHOD FOR MANUFACTURING A SHIELDED CABLE AND FOR PROCESSING A SHIELD OF THE CABLE

(71) Applicant: MD ELEKTRONIK GmbH, Waldkraiburg (DE)

(72) Inventor: Johann Friesinger, Rechtmehring (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 0 days.

(21) Appl. No.: 14/806,702

(22) Filed: Jul. 23, 2015

(65) Prior Publication Data
US 2016/0035462 A1    Feb. 4, 2016

(30) Foreign Application Priority Data

Jul. 30, 2014    (EP) .................................... 14002647

(51) Int. Cl.
| | |
|---|---|
| H01R 43/00 | (2006.01) |
| H05K 13/00 | (2006.01) |
| H01B 11/18 | (2006.01) |
| H02G 1/12 | (2006.01) |
| H01B 13/016 | (2006.01) |

(52) U.S. Cl.
CPC ......... *H01B 11/1895* (2013.01); *H01B 13/016* (2013.01); *H02G 1/1256* (2013.01); *H02G 1/1297* (2013.01)

(58) Field of Classification Search
CPC ............... H01B 11/1895; H01B 13/016; H01B 13/0165; H02G 1/1256; H02G 1/1297; Y10T 29/49174; Y10T 29/49181; Y10T 29/49192

USPC ......... 29/828, 854, 857, 861, 867; 174/75 C, 174/653; 81/9.51; 439/99
See application file for complete search history.

(56) References Cited

U.S. PATENT DOCUMENTS

| | | | |
|---|---|---|---|
| 4,719,697 A | 1/1988 | Schwartzman et al. | |
| 6,019,615 A * | 2/2000 | Masuda ............... | H01R 9/0518 174/653 |
| 6,330,839 B1 * | 12/2001 | Amrein ................ | H02G 1/1273 29/828 |
| 7,598,455 B2 * | 10/2009 | Gump .................. | H01R 9/0518 174/75 C |

(Continued)

FOREIGN PATENT DOCUMENTS

| | | |
|---|---|---|
| CA | 2885363 A1 | 5/2014 |
| DE | 102012020798 B3 | 4/2014 |

(Continued)

*Primary Examiner* — Donghai D Nguyen
(74) *Attorney, Agent, or Firm* — Leydig, Voit & Mayer, Ltd.

(57) ABSTRACT

A method for manufacturing a cable having a wire, a shield, a jacket, and a sleeve electrically contacted to the shield, includes removing the jacket at an end of the cable so that the shield is exposed. A support clamp is attached in such a way that the support clamp is electrically contacted to the shield and that, at an end of the shield, a projecting portion protrudes axially from the support clamp, the shield surrounded by the support clamp having a radial distance from an outer contour of the support clamp. The end of the shield is severed in such a way that, after the severing operation, a length of the projecting portion is shorter than the radial distance in a state in which the shield is folded radially outwardly. The sleeve is mounted so that it is disposed radially outwardly of the support clamp and electrically contacted thereto.

8 Claims, 5 Drawing Sheets

(56) References Cited

U.S. PATENT DOCUMENTS

| | | |
|---|---|---|
| 8,969,725 B2 | 3/2015 | Mayer |
| 2002/0050062 A1 | 5/2002 | Sato et al. |
| 2007/0173122 A1 | 7/2007 | Matsuoka |

FOREIGN PATENT DOCUMENTS

| | | |
|---|---|---|
| EP | 2523275 A1 | 11/2012 |
| JP | 201250169 A | 3/2012 |

\* cited by examiner

C-C

METHOD FOR MANUFACTURING A SHIELDED CABLE AND FOR PROCESSING A SHIELD OF THE CABLE

CROSS-REFERENCE TO PRIOR APPLICATION

Priority is claimed to European Patent Application No. EP 14 002 647.7, filed on Jul. 30, 2014, the entire disclosure of which is hereby incorporated by reference herein.

FIELD

The present invention relates to a method for manufacturing a shielded cable assembly which includes, in particular, a connector and is used for transmitting HF signals. The present invention also relates to a device for manufacturing or assembling such a cable, and to cables which are manufactured using the method and device.

Such cables can be used in motor vehicles or aircrafts, for example, and are frequently required in large quantities. Simple construction and simple preassembly are important factors in the economic supply of corresponding cables. In addition, such cables must be well shielded electromagnetically so that no emitted electromagnetic waves can cause problems in the on-board electronics of the respective vehicle, for example. Furthermore, such cables must be produced such that they can be used to transmit signals having very high frequencies, as required for high-quality video signal transmission, for example. Also advantageous is a design which requires little installation space and, in particular, permits narrow bending radii of the cable in the region of the connectors.

BACKGROUND

In the European Patent Application EP 2 523 275 A1 of the Applicant, a shielded cable and a device for manufacturing such a cable are described. Also disclosed in EP 2 523 275 A1 is a corresponding manufacturing method. The corresponding cable known heretofore has a shield which is folded over around a support clamp.

Similarly, German Patent DE 10 2012 020 798 B3 teaches to fold the shield over a support clamp using a device designed for this purpose.

SUMMARY

In an embodiment, the present invention provides a method for manufacturing a cable having at least one wire, a shield, a jacket, and a sleeve electrically contacted to the shield. The jacket is removed at an end of the cable so that the shield is exposed. A support clamp is attached in such a way that the support clamp is electrically contacted to the shield and that, at an end of the shield, a projecting portion protrudes axially from the support clamp, the shield surrounded by the support clamp having a radial distance from an outer contour of the support clamp. The end of the shield is severed in such a way that, after the severing operation, a length of the projecting portion is shorter than the radial distance in a state in which the shield is folded radially outwardly. The sleeve is mounted so that the sleeve is disposed radially outwardly of the support clamp and electrically contacted to the support clamp.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
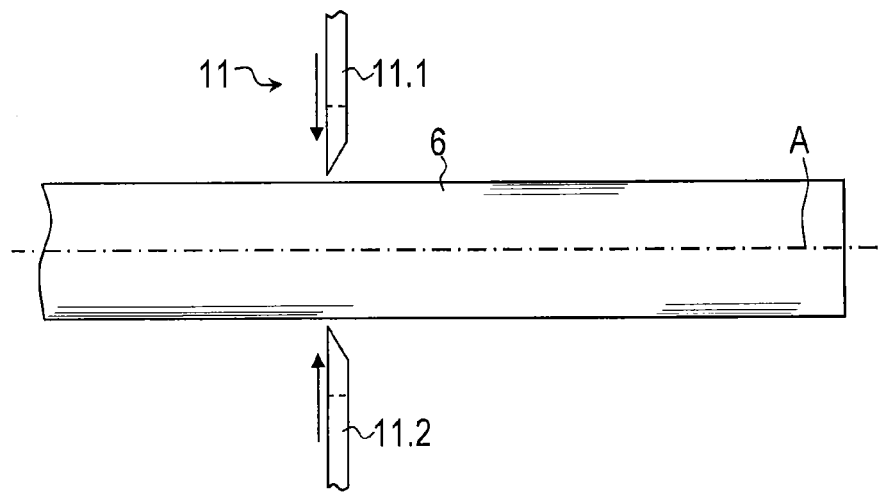
FIG. 1 is a side view showing a cable and a cutting tool at the beginning of the processing.

In an embodiment, the present invention provides a method for manufacturing high-quality cables that enables cables to be produced with relatively low manufacturing outlay and such that the cables so manufactured exhibit a high level of EMC imperviousness and can be produced accurately to transmit high data rates. Other embodiments of the present invention provide a novel device for manufacturing such high-quality cables, as well as cables manufactured in accordance with the method.

In accordance with an embodiment of the present invention, the method for manufacturing a cable having at least one wire, a shield, a jacket, and a sleeve electrically contacted to the shield, includes the following steps:

removing the jacket at an end of the cable so that the shield is exposed there, attaching a support clamp in such a way that the support clamp is electrically contacted to the shield and that, at the end of the shield, a projecting portion protrudes axially from the support clamp, the shield surrounded by the support clamp having a radial distance B from the outer contour of the support clamp, severing the end of the shield in such a way that after the severing operation, the length of the projecting portion is shorter than radial distance B when the shield is folded radially outwardly, mounting the sleeve so that it is disposed radially outwardly of the support clamp and electrically contacted thereto.

Accordingly, the shield is cut so short that it cannot be everted around the support clamp; i.e., that even when everted, the shield does not project beyond the outer diameter of the support clamp. In particular, the shield may be cut so short that the projecting portion is smaller than the material thickness or the wall thickness of the support clamp.

The formulation that the after the severing operation, the length of the projecting portion is shorter than outer diameter of the support clamp also includes a method where upon completion of this step, the projecting portion is zero; i.e., the projecting portion is completely removed. Complete removal of the projecting portion may be accomplished, for example, if the layer of the cable end located radially inwardly with respect to the shield can at least (radially) partially be removed by removal of material.

The severing operation may be understood to be a process that locally breaks the bond of the shield, which may be made of wire mesh, for example. The process selected for the severing operation may be, for example, a chip-removing machining process whereby the end of the shield is mechanically severed with chips being formed in the process.

In a preferred variant, the cable has a plurality of wires.

During the severing operation, the support clamp advantageously serves as a support for the shield to receive machining forces. In particular, during the severing operation, a tool may be moved axially (i.e., along the longitudinal axis) toward the end face of the support clamp, so that the tool presses the end of the shield against the end face.

In a further embodiment of the present invention, the support clamp is attached using a crimping process. In this manner, the support clamp can be electrically contacted to the shield and in particular also mechanically fixed on the end of the cable.

Advantageously, the sleeve may be electrically contacted directly on the support clamp without any intermediate layer therebetween. In this step, too, a crimping process may be used to attach the sleeve on the support clamp and electrically contact it thereto.

Advantageously, the severing is accomplished with the aid of at least one rotating cutting edge of a tool. In particular, the at least one cutting edge may rotate about the longitudinal axis of the end of the cable. The tool used may, for example, be a milling cutter, in particular an end milling cutter or a surface milling cutter. Accordingly, in particular the severing of the end of the shield may be performed using a milling process.

Advantageously, the end face of the support clamp facing the end of the cable is machined by the tool by removal of material. For example, the end face of the support clamp may be milled flat after severing the end of the shield (in particular in one operation). Thus, in this material-removing machining process, the machining forces are introduced into the support clamp.

In an embodiment of the present invention, a tube is moved by a drive mechanism relative to the tool along the longitudinal axis of the end of the cable prior to severing the shield. The movement may advantageously be imparted by an electric drive. The inner diameter of the tube is smaller than the outer diameter of the shield, but greater than a foil located radially within the shield. Consequently, the movement of the tube along the longitudinal axis results in widening of the shield. Preferably, the tube is moved along the longitudinal axis until its end is positioned in close proximity to the end face of the support clamp (for example, only fractions of a millimeter therefrom).

Subsequently, the severing may advantageously be carried out using a tool having a bore, the tube being disposed within the bore. In order to perform the severing operation, the tool is then moved relative to the tube along the longitudinal axis of the end of the cable. Thus, the tube serves, on the one hand, to widen the shield in the manner of an everting tube and, on the other hand, to guide the tool along the longitudinal axis of the end of the cable, and also as a protective device to prevent the cable, especially the wire or wires, from being damaged during severing of the shield. Preferably, the tube (as well as the cable) will not rotate, but the tool can rotate during the severing operation.

In the following, the "bore" will be understood to be a cutout whose inwardly facing surface does not necessarily have to be a closed surface. Rather, the bore is to be understood as a free volume or hollow space in the tool.

In an embodiment of the present invention, ends of the at least one wire may be severed, the end face of the support clamp facing the end of the cable serving as a reference for the remaining length of the at least one wire. The respective end face, which was formed, for example, by removal of material and with corresponding accuracy, may thus serve as a starting or reference surface to precisely define the position of a cut line, and thus to precisely define the remaining length of the wire or wires.

An embodiment of the present invention provides a device for manufacturing a cable having at least one wire and a shield. The device includes a holding element for (in particular clampingly) holding an end of the cable at an outer diameter so that the longitudinal axis of the end of the cable has a defined orientation in space. The device further includes a tool having at least one cutting edge for severing the shield. The at least one cutting edge is rotatable about the longitudinal axis of the end of the cable with the aid of a drive mechanism. A relative motion parallel to the longitudinal axis can be produced between the at least one cutting edge and the end of the cable with the aid of a feed drive.

Accordingly, the tool has an axis of rotation which coincides with the longitudinal axis of the end of the cable in the device. Possible drive mechanisms include, for example, pneumatic drives or electric drives. In particular, it is advantageous if the tool is set into rotation by an electric drive and the feed drive is also in the form of an electric motor. Equally, the holding element may be movable by a drive mechanism, a pneumatic drive being preferably used in this application.

The tool advantageously has a bore for receiving the end of the cable. In particular, the axis of the bore, the axis of rotation of the tool and the longitudinal axis of the end of the cable are arranged such that they coincide with each other.

In a further embodiment of the present invention, the holding element is configured such that it engages an outer diameter of the end of cable to hold the same, this outer diameter being greater than the inner diameter of the bore of the tool. Preferably, the device is designed such that the holding element engages, in particular clampingly engages, the support clamp. In this case, the outer diameter of the end of the cable is the outer diameter of the support clamp.

Preferably, a tube is disposed within the bore of the tool, and the tool is movable relative to the tube along the longitudinal axis of the end of the cable. In order to enable movement of the tube along the longitudinal axis, the device preferably has a drive mechanism producing this linear movement. The drive mechanism used to move the tube is advantageously in the form of an electric drive.

Advantageously, the at least one cutting edge is designed to be suitable for material-removing machining of a support clamp made of a metal material, such as a bronze material.

The tool may in particular take the form of a milling cutter, in particular an end milling cutter or a surface milling cutter.

In addition, the device advantageously has an abutment element capable of being brought into engagement with an end face of a support clamp facing the end of the cable. Furthermore, the device may have a severing device adapted to sever the one or more wires along a severing line. Moreover, the severing device is positioned in a defined manner relative to the abutment element so that the severing line extends at a defined distance from the abutment element.

An embodiment of the present invention provides a cable which is manufactured in accordance with the inventive method and which has at least one wire, a shield, a jacket, and a sleeve electrically contacted to the shield, a support clamp being electrically contacted to the shield and mechanically secured thereto.

Advantageously, the end face of the support clamp facing the end of the cable is machined by removal of material. Such cables can be easily recognized, for example, by corresponding machining marks on the surface of the end face of the support clamp facing the end of the cable.

In a preferred variant, the cable has a plurality of wires.

In a further embodiment of the present invention, the cable has four wires which are twisted together. The cable may in particular be configured according to a star quad arrangement.

Advantageously, the sleeve is contacted directly to the support clamp located radially inwardly thereof. Accordingly, the shield of the cable is not folded over or everted, so that no shield layer is present between the support clamp and the sleeve. The sleeve surrounds the support clamp, making direct contact therewith.

In accordance with another embodiment, the present invention includes a cable having one or more wires, a shield, a jacket, and a sleeve electrically contacted to the shield, a support clamp being electrically contacted to the shield, and the end face of the support clamp facing the end of the cable being machined by removal of material.

The present invention enables the manufacture of high-quality cables which exhibit a high level of EMC imperviousness and can be produced accurately to transmit high data rates. In particular, the present invention enables transmission of HF signals at high data rates. In the following, "HF signals" will be understood to be signals which are produced with the aid of high-frequency technology, including also UHF or VHF signals, for example. These include in particular also digital signals. Such signals are transmittable at data rates greater than or equal to 10 MBit/s.

Because of the accuracy of manufacture, the length of the end or ends of the wire or wires positioned in the sleeve can be minimized, making it possible to reduce also the length of the sleeve itself. This is not only advantageous in terms of material savings, but also enables space-saving use of the cable in confined environments, particularly when installed in vehicles.

FIG. 1 shows in a side view an end of a cable to be processed or preassembled. In this figure, only an outer jacket 6 can be seen of the cable. Jacket 6 is made of electrically insulating material.

Figure 8A:
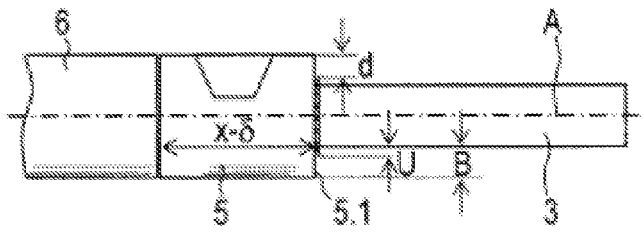
FIG. 8a is a side view showing the cable with the shield severed.
Figure 8B:
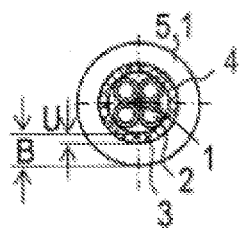
FIG. 8b is an end face view showing the cable with the shield severed.
Figure 12:
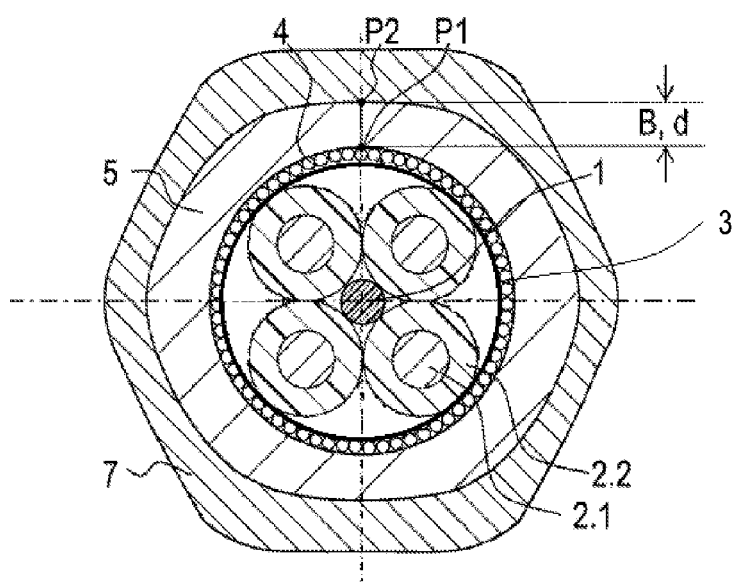
FIG. 12 is an enlarged cross-sectional view showing the cable with the sleeve mounted thereon.

In the exemplary embodiment presented here, the cable has a central filler 1 of insulating material and four wires 2 twisted therearound (see, for example, FIGS. 8b or 12). Wires 2 each include an inner conductor 2.1 and an insulation 2.2, each of conductors 2.1 being surrounded by an insulation 2.2. Disposed radially outwardly of wires 2 is first an electrically conductive foil 3 and a shield 4, here in the form of a braided shield. Shield 4 is enclosed by insulating jacket 6 over the major portion of the cable length. Such cables are frequently referred to as "star quads." The four wires 2 are twisted together, whereby a high level of crosstalk attenuation can be achieved. The cable has a longitudinal axis A in the region of its end.

Figure 2:
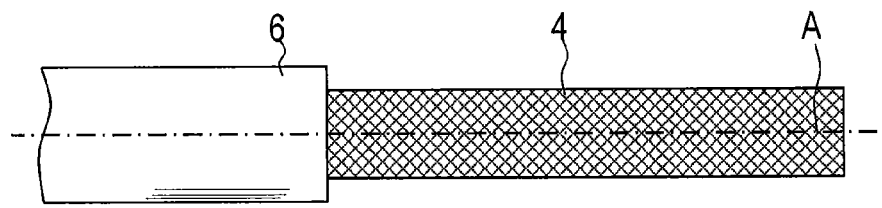
FIG. 2 is a side view showing the cable with the shield exposed at the end thereof.

During assembly, first, the end of the cable is processed with a cutting tool 11 (FIG. 1) in a device for manufacturing the cable assembly. The cutting tool includes two cutting blades 11.1, 11.2, which are V-shaped to grip around jacket 6. In order to cut jacket 6, cutting blades 11.1, 11.2 are approached toward each other orthogonally to longitudinal axis A until cutting blades 11.1, 11.2 have penetrated to a sufficient depth into jacket 6. Subsequently, the end of jacket 6 is pulled off in the axial direction so that, finally, jacket 6 is removed at one end of the cable and the inwardly disposed shield 4 is exposed there, as shown in FIG. 2.

The pulling-off of jacket 6 may also be performed in two steps so that shield 4 is exposed, but the end of jacket 6 is not yet completely pulled off, so that the end of shield 4 is temporarily held together for further processing.

Figure 3:
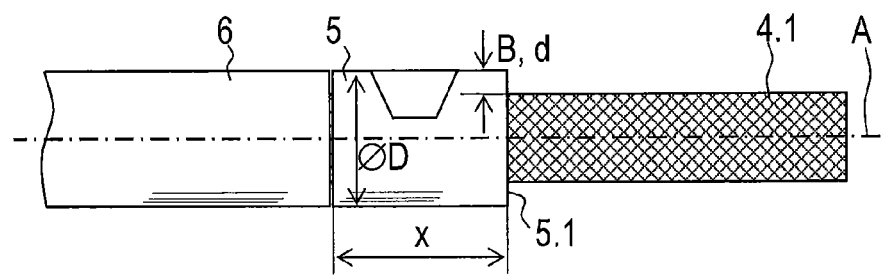
FIG. 3 is a side view showing the cable with a support clamp attached thereon.

Next, an electrically conductive support clamp 5 which, in the exemplary embodiment presented here, is made of a tin-coated bronze material, is pressed or crimped around shield 4 (FIG. 3) so that support clamp 5 is electrically contacted to shield 4 and also fixedly mechanically connected thereto. Support clamp 5 has a substantially cylindrical or hollow cylindrical shape having an axial extent x, an outer diameter D, and a wall thickness d. Further, shield 4 surrounded by support clamp 5 has a radial distance B from the outer contour of support clamp 5 (see also FIGS. 8a, 8b). In the present case, radial distance B and wall thickness d are equal because no intermediate layer is present between shield 4 and the inner surface of support clamp 5. Because support clamp 5 is crimped, its outer contour in cross section may, in a strict sense, deviate from an annular shape. In any case, distance B is the distance measured from the outer envelope of shield 4 (in support clamp 5 near the end face 5.1) to a radially outer point on the outer contour of support clamp 5 (see also FIG. 12).

Furthermore, support clamp 5 has an end face 5.1 facing the end of the cable, and a further, axially opposite end face facing jacket 6. At the end of shield 4, a projecting portion 4.1 thereof protrudes axially from support clamp 5.

Figure 4:
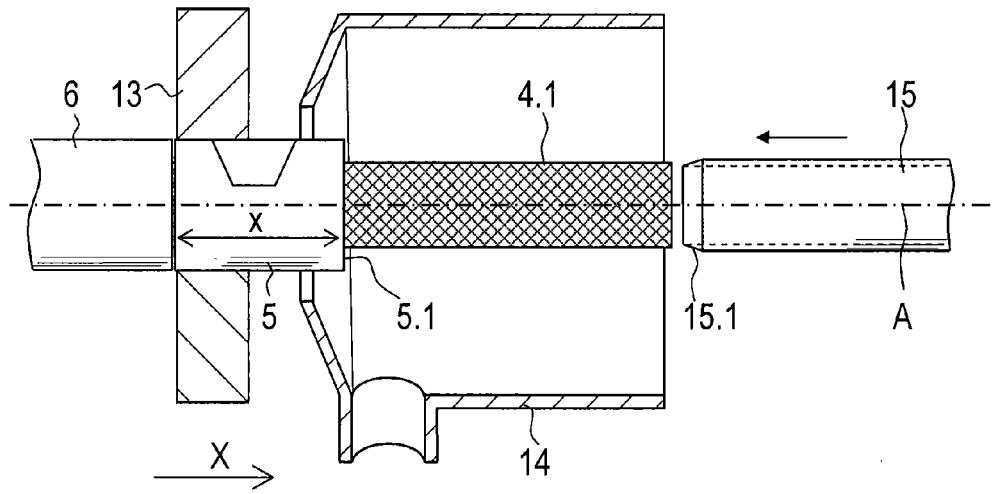
FIG. 4 is a side view showing the cable located in a device for further processing.

In a subsequent step in the manufacture or assembly of the cable, the cable is clamped in the device using a holding element 13 as shown in FIG. 4, with holding element 13 engaging the outer diameter of support clamp 5. In the present exemplary embodiment, holding element 13 takes the form of two clamping jaws which are movable toward each other perpendicularly to longitudinal axis A, the movement of the clamping jaws being accomplished by a pneumatic drive forming part of the device. The end of the cable is fixed by the holding element in such a way that longitudinal axis A of the end of the cable has a defined orientation, namely an orientation parallel to direction X.

Furthermore, the device for manufacturing the cable includes an extraction hood 14, into which the end of the cable is introduced. In this position, end face 5.1 of support clamp 5, and at least part of the projecting portion 4.1 of shield 4, are in the effective range of extraction hood 14.

Moreover, the device for manufacturing the cable has a tube 15 which is movable axially, i.e., along longitudinal axis A, toward support clamp 5. The inner diameter of tube 15 is smaller than the outer diameter of shield 4 in the region of the projecting portion 4.1, in particular not greater than the inner diameter of shield 4 in the region of the projecting portion 4.1. Moreover, tube 15 has a chamfer on the end face oriented toward the end of the cable, so that tube 15 has, as it were, a circumferential cutting edge 15.1. Optionally, the end of shield 4 may be slightly widened as a preparatory measure, for example, by an air blast, before tube 15 enters underneath shield 4.

Figure 5:
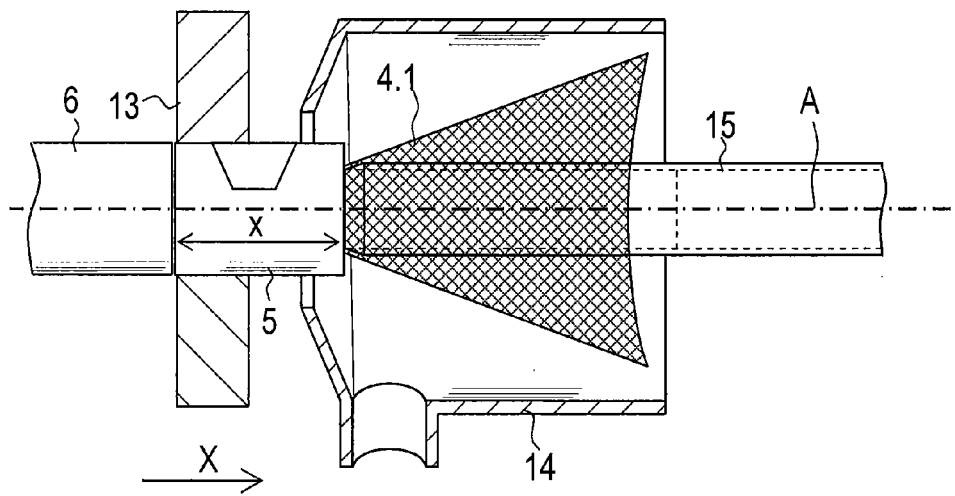
FIG. 5 is a side view showing the cable in the device with the shield widened.

Then, as shown in FIG. 5, tube 15 is moved axially toward support clamp 5, whereby tube 15 enters inwardly of shield 4 and widens the same. Tube 15 which, in the present example, could also be referred to as an everting tube, is moved axially by a driving mechanism provided for this purpose in the device until it gets close to end face 5.1 of support clamp 5.

Figure 6:
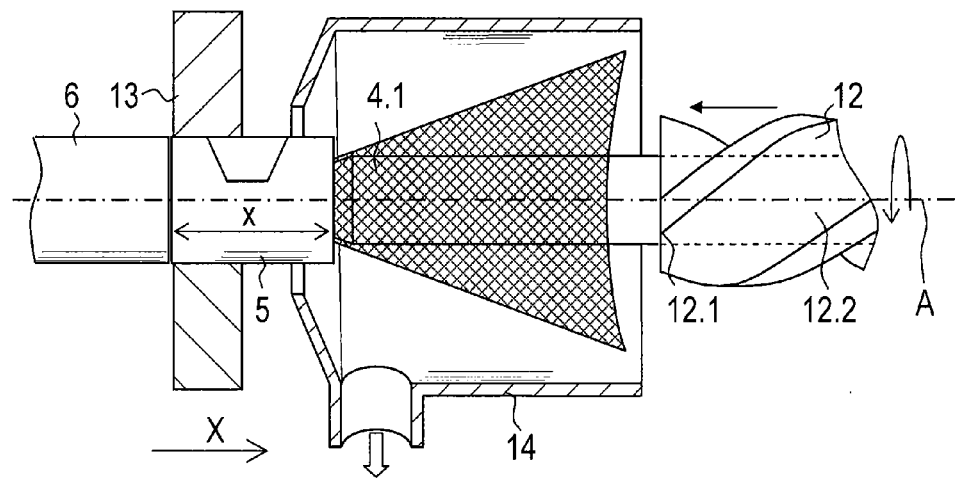
FIG. 6 is a side view showing the cable and a tool prior to severing the shield.
Figure 7A:
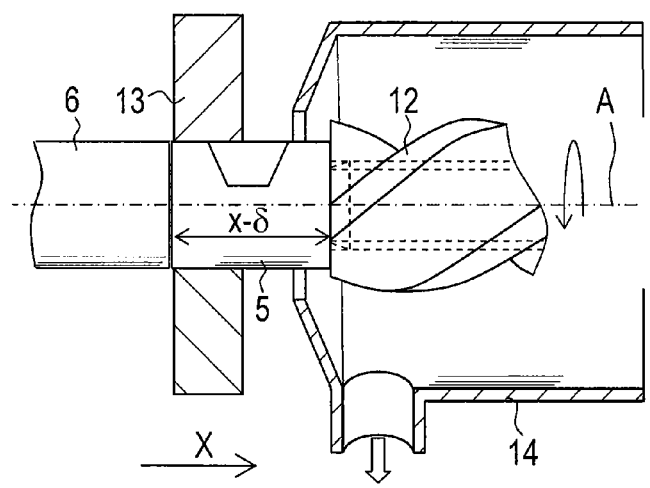
FIG. 7a is a side view showing the cable with the tool in an end position.
Figure 7B:
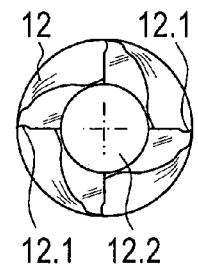
FIG. 7b is an axial view of the tool.

Furthermore, as shown in FIGS. 6 and 7b, the device for manufacturing the cable includes a tool 12 having a plurality of cutting edges 12.1. Tool 12 has a central bore 12.2 whose inner diameter is slightly greater than the outer diameter of tube 15. Tube 15 is disposed to extend into bore 12.2, and tool 12, which here takes the form of a face milling cutter, is axially movable relative to tube 15. Tube 15 serves, as it were, as an axial guide for tool 12. The device for manufacturing the cable further includes a drive mechanism , which causes tool 12 to rotate. Another drive mechanism of the device serves as a feed drive capable of moving tool 12 in and opposite to direction X; i.e., along longitudinal axis A.

During further processing, the respective electric drive is activated and tool 12 is set into rotation about longitudinal axis A without tube 15 rotating in the process, so that, consequently, tool 12 rotates relative to tube 15. Tube 15 and tool 12 are positioned in coaxial relationship with one another and with longitudinal axis A of the end of the cable. Accordingly, cutting edges 12.1 of tool 12 rotate about longitudinal axis A of the end of the cable.

Rotating tool 12 is then moved axially along tube 15 toward support clamp 5. As a result, shield 4 is deformed and cut. The severed parts of shield 4 are removed with the aid of suction device cooperating with extraction hood 14. Thus, tube 15 serves not only as a guide for tool 12 and a means for widening shield 4, but also to protect the parts of the end of the cable that are located inwardly with respect to shield 4.

Tool 12 is moved axially to a point where end face 5.1 of support clamp 5 facing the end of the cable is machined by removal of material. The material removal may be minimal, for example, 0.1 mm. Thus, support clamp 5 then has an axial extent of x−δ auf, with δ=0.1 mm in the example illustrated. In this position, the end of shield 4 is severed as shown in FIG. 7a. During severing of shield 4, support clamp 5 serves as a support for shield 4 to receive machining forces. In other words, support clamp 5 exerts the axial force required to counteract the feed force of tool 12, so that shield 4 is axially supported against support clamp 5 during machining The machining forces are introduced into holding element 13 via support clamp 5.

FIGS. 8a and 8b show the end of the cable after shield 4 has been severed. The severing was performed such that length U of remaining projecting portion 4.1 is shorter than radial distance B when shield 4 is folded radially outwardly as in FIG. 8b.

End face 5.1 facing the end of the cable is now a machined surface and, therefore, meets the highest requirements in terms of precision, for example in terms of flatness. Thus, projecting portion 4.1 is so short that shield 4 can by no means be folded over in such a way that it could reach the outer diameter of support clamp 5.

Tube 15 of the device for manufacturing the cable serves not only to axially guide tool 12, but also to protect the layers located inwardly with respect to shield 4 or projecting portion 4.1 In the present case, electrically conductive foil 3 is contiguous with the interior of shield 4. Foil 3 is in no way damaged during the severing of projecting portion 4.1 and can therefore be seen in FIG. 8a.

Figure 9:
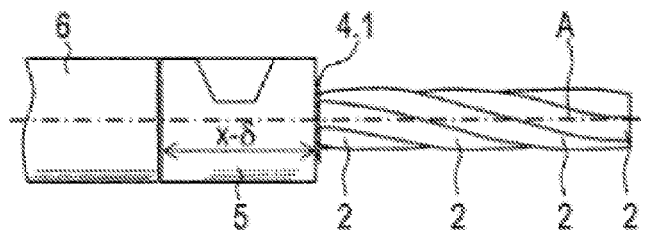
FIG. 9 is a side view showing the cable with the electrically conductive foil severed.

Next, foil 3 is removed so that the wires are exposed, as shown in FIG. 9. The method may also be used for cables having a foil radially outwardly of shield 4. In this case, the foil would be severed or removed by machining together with the shield.

Twisted wires 2 are then straightened out and cut to length. This is done in order to create a so-called "zero dimension." In the manufacture of high-quality cables, this must be carried out extremely precisely. Therefore, the device for manufacturing the cable has an abutment 16 and a cutting device 17 offset therefrom in direction X. Cutting device 17 includes two blades 17.1, 17.2 capable of severing the ends of wires 2. The cut line is located at a defined and accurately adjusted distance R from the abutment.

Figure 10:
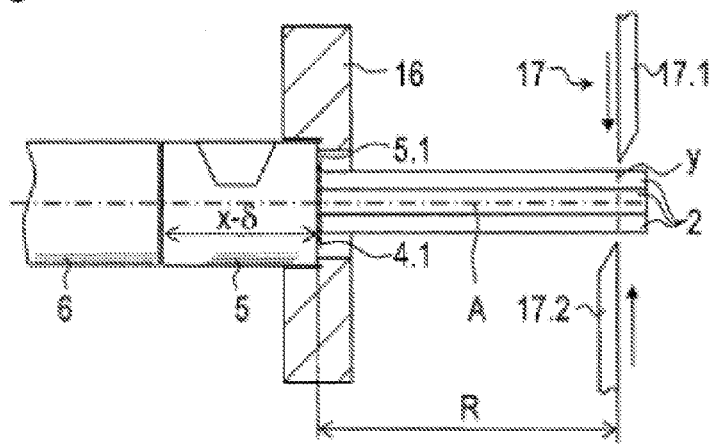
FIG. 10 is a side view showing the cable and a cutting device prior to severing the ends of the wires.

During the severing of the ends of wires 2, first, end face 5.1 facing the end of the cable; i.e., the machined end face 5.1, is brought into direct touching contact with the abutment 16, as shown in FIG. 10. Because of the short length of projecting portion 4.1, it is possible to preclude the possibility of shield 4, or parts thereof, being present between abutment 16 and support clamp 5 or the end face 5.1 thereof. This alone makes it possible to create the zero dimension extremely precisely. Moreover, in the exemplary embodiment presented here, end face 5.1 is machined by removal of material, and thus manufactured extremely precisely, so that the accuracy of the zero dimension is further increased. Thus, once the cable is brought into the appropriate position in accordance with FIG. 10, blades 17.1, 17.2 are moved orthogonally to longitudinal axis A of the cable end, and the ends of wires 2 are severed along a cut line y. After that, wires 2 extending from support clamp 5 have a precise length relative to end face 5.1 of support clamp 5.

Subsequently, wires 2 are bared of insulation. Insulations 2.2 are slit at a distance of 2.5 mm from the respective ends of wires 2 and then removed. After that, so-called "internal conductors" are attached to the ends of conductors 2.1 using, for example, a crimping process. Then, wires 2 and the internal conductors are mounted together in an insulative body.

Figure 11:
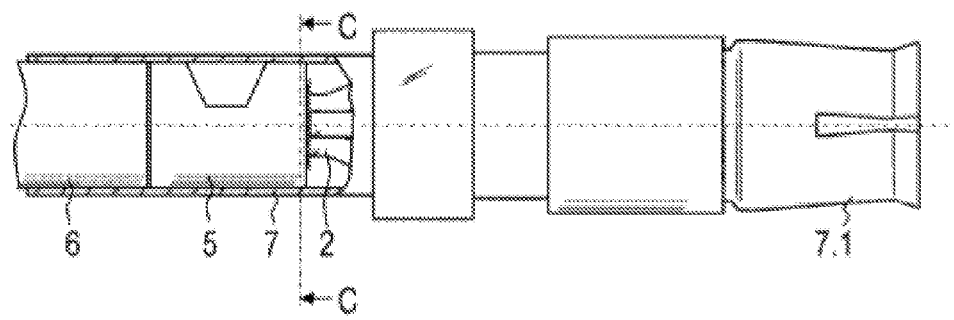
FIG. 11 is a side view showing the cable with the sleeve mounted thereon.

In accordance with FIG. 11, a sleeve 7 is then slid onto the insulative body, support clamp 5 and jacket 6, the insulative body and the internal conductors being disposed within sleeve 7 to the right of support clamp 5 (not visible in FIG. 11). Such a sleeve 7 may also be referred to as "external conductor sleeve." In the present exemplary embodiment, an electrically conductive sleeve 7 is shown, which includes a coupling end 7.1 for creating a plug-and-socket connection with a further coupling part. Sleeve 7, particularly the portion surrounding support clamp 5, is substantially hollow cylindrical in configuration. Moreover, sleeve 7, at least the hollow cylindrical tubular portion thereof, is closed; i.e., has no slit extending along the entire length thereof.

Then, using a crimping process, an electrical and mechanical bond is created between sleeve 7 and the support clamp 5, which is electrically conductively connected to shield 4. To this end, the sleeve 7 located on the cable is placed between crimp indentors. The hollow cylindrical portion of sleeve 7 is then compressed by the crimp indentors to the desired extent against support clamp 5.

FIG. 12 is a cross-sectional view along line C-C of the cable of FIG. 11. As can be seen in this figure, sleeve 7 is in direct contact with support clamp 5 without any intermediate layer therebetween. FIG. 12 illustrates radial distance B which, in this embodiment, is equal to wall thickness d of support clamp 5. Radial distance B is the distance between the outer contour of support clamp 5 and shield 4 in a region at end face 5.1 where shield 4 is surrounded by support clamp 5. As can be seen in FIG. 12, the radial outer contour of shield 4 defines the starting point of the distance dimension. Although the cross section of support clamp 5 may not be perfectly annular as a result of the crimping process, radial distance B is always the radially outwardly directed distance from a first point P1 on the outer contour of shield 4 to a second point P2 on the outer contour of support clamp 5, which is located radially outwardly from first point P1. After shield 4 has been severed, projecting portion 4.1 is always shorter than radial distance B, even when shield 4 is folded radially outwardly. As a result, the end of projecting portion 4.1 does not reach the outer contour of support clamp 5 anywhere around the circumference thereof. Since in the exemplary embodiment presented here, after shield 4 has been severed, projecting portion 4.1 has the same length everywhere around the circumference and cannot reach the outer contour of support clamp 5, it holds that length U of the projecting portion is smaller than the minimum radial distance B, it being possible for B to vary slightly around the circumference of support clamp 5. Thus, in the exemplary embodiment shown, distance B can be understood to be the minimum distance (or the minimum wall thickness d) around the circumference.

The cable so configured is used, for example, in vehicles to transmit HF signals (high-frequency signals). Due to the high data transmission rates (e.g., 480 MBit/s), high voltage frequencies on the order of 40 MHz, for example, arise in the cable. It has now been found that the presented method and the associated device allow cables to be manufactured with extreme precision, so that high transmission rates are achievable during operation of such cables.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for manufacturing a cable having at least one wire, a shield, a jacket, and a sleeve electrically contacted to the shield, the method comprising:
   removing the jacket at an end of the cable so that the shield is exposed at the end of the cable;
   attaching a support clamp in such a way that the support clamp is electrically contacted to the shield and that, at an end of the shield, a projecting portion protrudes axially from the support clamp, the shield surrounded by the support clamp having a radial distance from an outer contour of the support clamp;
   severing the end of the shield in such a way that, after the severing operation, a length of the projecting portion is shorter than the radial distance in a state in which the shield is folded radially outwardly; and
   mounting the sleeve so that the sleeve is disposed radially outwardly of the support clamp and electrically contacted to the support clamp.

2. The method as recited in claim 1, wherein during the severing the end of the shield, the support clamp serves as a support for the shield to receive machining forces.

3. The method as recited in claim 1, wherein the severing the end of the shield is accomplished using at least one rotating cutting edge of a tool.

4. The method as recited in claim 3, wherein the at least one cutting edge rotates about the longitudinal axis of the end of the cable.

5. The method as recited in claim 1, wherein an end face of the support clamp facing the end of the cable is machined by a tool by removal of material.

6. The method as recited in claim 1, wherein, prior to the severing the end of the shield, a tube is moved by a drive mechanism relative to a tool along the longitudinal axis of the end of the cable so as to widen the shield.

7. The method as recited in claim 6, wherein the severing the end of the shield is accomplished using the tool having a bore, the tube is disposed within the bore, and the tool is movable relative to the tube along the longitudinal axis of the end of the cable.

8. The method as recited in claim 1, wherein an end of the at least one wire is severed, and wherein an end face of the support clamp facing the end of the cable serves as a reference for a remaining length of the at least one wire.

* * * * *